United States Patent [19]

Riedel

[11] Patent Number: 4,973,513

[45] Date of Patent: Nov. 27, 1990

[54] PROCESS FOR APPLYING A RELEASE COATING TO A WET NONWOVEN BACKING AND ARTICLE

[75] Inventor: John E. Riedel, St. Paul, Minn.

[73] Assignee: Minnesota Mining and Manufacturing Company, St. Paul, Minn.

[21] Appl. No.: 504,531

[22] Filed: Apr. 4, 1990

[51] Int. Cl.⁵ ................................................ B32B 7/00
[52] U.S. Cl. .................................. 428/252; 427/208.8;
427/393.5; 427/407.1; 427/421; 427/430.1;
428/254; 428/411.1
[58] Field of Search ............... 427/208.8, 393.5, 407.1,
427/421; 428/252, 254, 411.1

[56] References Cited

U.S. PATENT DOCUMENTS

| | | | |
|---|---|---|---|
| 2,532,011 | 11/1950 | Dahlquist et al. | 154/53.5 |
| 3,121,021 | 2/1964 | Copeland | 117/122 |
| 3,364,063 | 1/1968 | Satas | 117/98 |
| 3,575,782 | 4/1971 | Hansen | 161/141 |
| 3,677,788 | 7/1972 | Zirnite | 117/11 |
| 4,427,737 | 1/1984 | Cilento et al. | 428/315.7 |
| 4,728,571 | 3/1988 | Clemens et al. | 428/352 |

Primary Examiner—Bernard Pianalto
Attorney, Agent, or Firm—Donald M. Sell; Walter N. Kirn; Dale A. Bjorkman

[57] ABSTRACT

Release coated nonwoven sheet materials are provided through the process of (a) forming a web from fibers; (b) applying a water-based binder to the web; (c) applying a water-based release coating to one side of said web while the web is still wet from the application of the binder; and (d) drying said web. This process eliminates at least one heating step, with unexpected control of the migration of the release coating through the web.

10 Claims, No Drawings

PROCESS FOR APPLYING A RELEASE COATING TO A WET NONWOVEN BACKING AND ARTICLE

FIELD OF THE INVENTION

The present invention relates to applications of release coatings to nonwoven fabrics.

BACKGROUND

Pressure sensitive adhesive tapes are provided with release coatings to prevent roll blocking or adhesive transfer from the pressure-sensitive adhesive coated side of a tape backing that is wound convolutely upon itself to the non-coated side of the tape backing. One form of release coating is the low adhesion backsize or LAB. One particular form of tape backing that is preferred for use in medical applications as well as other applications is made from a nonwoven fabric web.

Nonwoven tape backings are generally made by first forming a web and applying a binder to the web to adhere the fibers one to another at their crossing points. The thus prepared web is then heated to drive out the organic solvent or water from which the binder was applied, and the fabric is then transported to the next process step. In a second step, a release coating is applied to the web and the backing is again heated to drive out the organic solvent or water. Typically, the release coating is applied from a volatile solvent for easier control of the rate of migration of the release coating through the web backing. A third separate step is then performed wherein an adhesive is applied to the uncoated side of the web. The web is again heated to drive out the organic solvent or water from which the adhesive was applied and is then wound into a roll for transportation to the slitter, where individual size rolls of tape are separated from the master roll.

Each of the above separate heating steps results in the expenditure of substantial energy and time. Additionally, the application of the binder, release coating and adhesive from solvents results in high material costs and raises pollution concerns when the solvent volatilizes and is lost to the atmosphere.

SUMMARY OF THE INVENTION

Release coated nonwoven sheet materials are provided through the process of (a) forming a web from fibers; (b) applying a water-based binder to the web; (c) applying a water-based release coating to one side of said web while the web is still wet from the application of said binder; and (d) drying said web. By selecting only water-based binders and water-based release coatings for use in preparing the nonwoven sheet material, and by applying the water-based release coating to the web while the water-based binder is still wet, it is possible to eliminate at least one heating step, with unexpected control of the migration of the release coating through the web. This process results in the reduction of the amount of energy required in the process steps, the elimination of the need to transport materials from one process step to another remote from the first, and the substantial reduction in the amount of solvent emission pollution as compared to conventional processes of preparing coated nonwoven articles.

DETAILED DESCRIPTION OF PRESENTLY PREFERRED EMBODIMENTS

Nonwoven webs for use in preparation of nonwoven tape backings are made in accordance with conventional methods known in the art, including wet laid methods, dry laid methods such as air layering and carding, and direct laid methods such as spunbonding and meltblowing. Examples of such methods are disclosed in U.S. Pat. No. 3,121,021 to Copeland and U.S. Pat. No. 3,575,782 to Hansen.

The nonwoven web is formed from synthetic or natural fibers selected according to the desired properties of the resulting web. Examples of textile fibers appropriate for use in the backing webs include polyester, polyolefin, polyamide, rayon, cotton, or the like. The nonwoven web may also incorporate reinforcing filaments, such as polyester, or shirring fibers such as "Lycra" spandex yarns.

The thus provided web of fibers is coated with a water-based binder. Examples of such binders include latexes incorporating acrylics, styrene/butadiene rubbers, vinylacetate/ethylenes, vinylacetate/acrylates, polyvinyl chloride, polyvinyl alcohols, polyurethanes and vinylacetates. Such binders are typically applied to web at 25 to 35 percent solids by any suitable coating method, including wire-wound rod, reverse roll, air knife, direct and offset gravure, trailing blade, print bond and spray coating methods. The binder is applied in amounts sufficient to provide the desired property of the ultimately formed material, these amounts being readily apparent to the skilled artisan in the nonwoven manufacturing field. For example, more binder may be applied to produce a stronger material of a similar construction.

After the binder has been applied, but before the web itself is dry, the water-based release coating is applied using conventional coating methods of the textile industry, as discussed above in coating of binder. The water-based release coating materials include polyethylenes, fluorochemicals, acrylates, silicones, vinyl copolymers and combinations of these polymers with other polymers. Preferably, the release coating is a low adhesion backsize comprising poly(dimethyl siloxane) or acrylate polymers. Acceptable low adhesion backsizes are disclosed, for example, in U.S. Pat. No. 4,728,571 to Clemens, et al.

It is envisioned that on production scale equipment, the release coating will be applied to the wet web between about 4 and 20 seconds after application of the binder.

After the release coating has been applied, the nonwoven material is dried using any appropriate drying means. For example, drying means that are conventional in the nonwoven textile arts include contact drying, circulating air ovens, impingement ovens and through-air ovens Preferably, the web is dried in a circulating air oven at about 145–155° C. for about one minute. The heat source is preferably located on the same side of the web in the oven as the release coating, so that wicking of the release coating through the web is not encouraged by uneven drying. It is envisioned that on production scale equipment, the wet release coated web will be conveyed to the drying oven between about 4 and 20 seconds after application of the release coating.

At this point, the web may be wound in a roll for transportation for later application of an adhesive, or it may be conveyed directly to an adhesive coater, followed by slitting into individual tape rolls.

The pressure-sensitive adhesive that is applied to the nonwoven tape backing may be solvent-based, water-based, or a hot melt adhesive. Suitable adhesives phenolic cured rubber based adhesives are disclosed in U.S. Pat. No. 2,708,192 to Joesting et al. Both water-based and solvent-based adhesives are disclosed in U.S. Pat. No. RE24,906 to Ulrich. Hot melt adhesives are disclosed, for example, in U.S. Pat. No. 4,833,179.

Surprisingly, it has been observed that there is minimal migration of the release coating into the wet web except adjacent to the area of application. In other words, the release coating does not diffuse through the wet binder material as would be expected of a mixture of two water-based materials. Migration is shown by testing a web prepared according to the process of the present invention that has not been coated with adhesive. The adhesive peel strength of a tape adhered to the non-release coated side of a web is measured and compared with the adhesive peel strength of a tape adhered to a web that has not been treated with a release coating. Minimal migration is experienced in the present invention, as demonstrated by measurements reflecting generally no significant loss of peel strength induced by the application of a release coating.

It has surprisingly been discovered that, using the methods of the present invention, less release coating material is required on the nonwoven web to achieve acceptable release properties for the tape backing. It is envisioned that the amount of release coating applied to the nonwoven web may be reduced by about 85%.

TEST METHODS

Procedures for evaluating pressure-sensitive adhesive constructions relative to their adhesion, #2 bond, roll unwind and accelerated aging under elevated temperature and humidity conditions are described in ASTM D-1000 under the corresponding paragraph headings. Accelerated aging studies were conducted at 42° C. and 90% relative humidity.

BACKINGS

Backing A

A blend of 50 parts polyester fiber Type L-30 (0.75 denier, 38 mm length, available from Hoescht-Celanese Greenville, S.C.), 30 parts standard rayon fiber (1.5 denier, 40 mm in length, available from Courtaulds North America, Inc., New York, N.Y.), and 20 parts Type H polyolefin fiber (1.5 denier, 51 mm length, available from Chori America, Inc., Los Angles, CA) were processed in a Hergeth Card (available from Hergeth Hollingsworth GMBH, Dülman, West Germany) to produce an approximately 35 gm/m$^2$ basis weight nonwoven web.

Backing B

Standard rayon fibers (1.5 denier, 40 mm length, available from Courtaulds North America, Inc., New York, N.Y.) were processed in a Hergeth Card to produce an approximately 22 gm/m$^2$ basis weight nonwoven web.

Backing C

Standard rayon fibers (1.5 denier, 40 mm length, available from Courtaulds North America, Inc., New York, N.Y.) were processed in a Hergeth Card to produce an approximately 22 gm/m$^2$ basis weight nonwoven web. The web was contacted with 820 denier "Lycra" spandex yarns, available from E. I. DuPont DeNemours Inc., Wilmington, DE which were maintained under tension at an approximately 0.42 cm. spacing. This tension was maintained through later binder and release coating application steps and the drying step.

Backing D

Standard rayon fibers (1.5 denier, 40 mm length, available from Courtaulds North America, Inc., New York, N.Y.) were processed in a Hergeth Card to produce an approximately 22 gm/m$^2$ basis weight nonwoven web that was saturation coated with "Rhoplex E-2559" (an approximately 45% solids acrylic latex, available from Rohm & Haas Co., Philadelphia, PA) which had been diluted to approximately 12% solids. After drying, the lightly bonded web had a basis weight of approximately 28 gm/m$^2$. This web was lightly bonded to facilitate transportation of the web from the card to the location of the binder and release coating application steps.

BINDERS

Binder AA

"Rhoplex E-2559," an approximately 45% solids acrylic latex, available from Rohm & Haas Co., Philadelphia, Pa.

Binder BB

"UNICAL type 76-4402," an approximately 50% solids styrene/butadiene rubber latex available from UNICAL, Corp., Charlotte, N.C.

Binder CC

"National Starch #76-6283," an approximately 45% solids acrylic/vinyl acetate copolymer latex, available from National Starch Corp., Bridgewater, N.J.

RELEASE COATING MATERIALS

RELEASE COATING 1

A 1% solids aqueous dispersion of a 65:35 segmented block copolymer of poly(dimethyl siloxane) and 2:1 bis-aminopropyl piperazine/isophorone diisocyanate copolymer was prepared as follows:

To a solution of 65 gm of 5000 number average molecular weight polydimethyl siloxane (PDMS) diamine (prepared according to Example 2 of EPO Published Application No. 0 250 248), 15.2 gm of N,N'-bis-(3-aminopropyl) piperazine (bisAPIP) in 530 mls of isopropyl alcohol (IPA) at 25° C. was added 19.8 gm of isophorone diisocyanate (IPDI) slowly over a 5 minute period. The exothermic reaction was controlled by means of an ice water bath to maintain the temperature at 15°–25° C. during the addition. The viscosity rose rapidly toward the end of the addition and the viscous yet clear reaction was stirred for an additional 1 hour. This provided a 20 percent by weight solution of the block copolymer in IPA. The resulting solution of the block copolymer was combined with 12.67 ml of 12(N) HCl. After stirring for 10 minutes the clear syrup was stirred vigorously while 500 ml of warm (45° C.) water was rapidly added. This provided a translucent solution which was transferred to a rotary evaporator and stripped under aspiration pressure to remove the IPA (530 ml). The resulting concentrate was diluted with 400 ml of water to provide the block copolymer dispersed at 10% solids in water. The block copolymer had 65 weight percent PDMS soft segments and 35 weight percent bisAPIP/IPDI hard segments. This solution was further diluted with sufficient water to provide a 1% solids aqueous dispersion.

RELEASE COATING 2

A 1% solids aqueous dispersion of a 60:40 segmented block copolymer of poly(dimethyl siloxane) and bis-aminopropyl piperazine/isophorone diisocyanate copolymer was prepared as in release coating 1, with amounts of reactants adjusted to provide the indicated component ratios.

RELEASE COATING 3

A 1% solids aqueous dispersion of a 50:50 segmented block copolymer of poly(dimethyl siloxane) and bis-aminopropyl piperazine/isophorone diisocyanate copolymer was prepared as in release coating 1, with amounts of reactants adjusted to provide the indicated component ratios.

RELEASE COATING 4

A 1% solids aqueous dispersion of a 45:35:5:20 tetrapolymer of methyl acrylate/N-vinyl pyrrolidone/acrylic acid/SiMac was prepared in the following manner:

Into a 1 L glass bottle was placed 45 parts methyl acrylate, 35 parts N-vinyl pyrrolidone, 5 parts acrylic acid, 20 parts 3-methacryloxy propyl-terminated polydimethyl siloxane having a number average molecular weight of about 15,000 (SiMac described in U.S. Pat. No. 4,728,571, incorporated herein by reference), 250 parts ethyl acetate, and 0.5 parts 2,2'-azobis(isobutyronitrile). The reaction bottle was purged with nitrogen, sealed and tumbled in a 55° C. bath for 42 hours. A 30% solution of this tetrapolymer was prepared in a 3:2 methyl ethyl ketone:isopropanol solvent blend. 300 g of this solution was diluted and neutralized by adding a solution of 6 g concentrated NH OH in 300 g water. A further 300 g of water and 60 g butyl carbitol was then added; the resultant mixture was agitated for 12 hours and organic solvents were removed under reduced pressure at 45° C., leaving a hazy white, viscous dispersion. The pH was adjusted to 10.0 by adding 6 g concentrated $NH_4OH$; 500 g of the resulting 7.9% solids dispersion was then further diluted with 275 g water and 15 g butyl carbitol, yielding a hazy white, medium viscosity dispersion containing 5% tetrapolymer, 5% butyl carbitol, and 90% water.

RELEASE COATING 5

A 3% solids aqueous dispersion of a 45:35:5:20 tetrapolymer of methyl acrylate/N-vinyl pyrrolidone/acrylic acid/SiMac was prepared as in release coating 4, with the solids content adjusted accordingly.

RELEASE COATING 6

A 3% solids aqueous dispersion of a 65:35 segmented block copolymer of poly(dimethyl siloxane) and bis-aminopropyl piperazine/isophorone diisocyanate copolymer was prepared as in release coating 1, with the solids content adjusted accordingly.

RELEASE COATING 7

A 1% solids aqueous dispersion of a 70:10:20 terpolymer of methyl acrylate/methacrylic acid/PS-850 (a siloxane polymer having 3–5% by weight mercaptopropyl functionality commercially available from Huls America Inc., Bristol, Pa.) was prepared as in release coating 4, with the monomer reactants selected to provide the indicated polymer.

RELEASE COATING 8

A 1% solids aqueous dispersion of a 45:30:10:15 tetrapolymer of methyl methacrylate/methyl acrylate/methacrylic acid/SiMac was prepared as in release coating 4, with the monomer reactants selected to provide the indicated polymer.

RELEASE COATING 9

A 1% solids aqueous dispersion of a 45:30:10:15 tetrapolymer of butyl methacrylate/methyl acrylate/methacrylic acid/SiMac was prepared as in release coating 4, with the monomer reactants selected to provide the indicated polymer.

RELEASE COATING 10

A 1% solids aqueous dispersion of a 80:8:12 terpolymer of ethyl methacrylate/diethyl amino ethyl methacrylate/PS-850 was prepared as in release coating 7 except that concentrated HCl was used to neutralize the reaction mixture, and the monomer reactants were selected to provide the indicated polymer.

RELEASE COATING 11

A 1% solids aqueous dispersion of a 70:10:20 terpolymer of ethyl methacrylate/methacrylic acid/SiMac was prepared as in release coating 4, with the monomer reactants selected to provide the indicated polymer.

RELEASE COATING 12

A 1% solids aqueous dispersion of a 35:30:10:25 tetrapolymer of methyl acrylate/octadecyl acrylate/methyl methacrylate/PS-850 was prepared as in release coating 7, with the monomer reactants selected to provide the indicated polymer.

RELEASE COATING 13

A 1% solids aqueous dispersion of a 50:15:10:25 tetrapolymer of methyl acrylate/methyl methacrylate/methacrylic acid/PS-850 was prepared as in release coating 7, with the monomer reactants selected to provide the indicated polymer.

RELEASE COATING 14

A 1% solids aqueous dispersion of a 50:15:10:25 tetrapolymer of methyl acrylate/isobornyl acrylate/methacrylic acid/PS-850 was prepared as in release coating 7, with the monomer reactants selected to provide the indicated polymer.

RELEASE COATING 15

A 1% solids aqueous dispersion of a 40:30:30 terpolymer of polydimethyl siloxane/920 molecular weight polyethylene oxide diamine/DYTEK A-IPDI was prepared as in release coating 1 except the neutralization step was omitted, and the monomer reactants were selected to provide the indicated polymer. Polyethylene oxide diamine is commercially available as Jeffamine ® ED900 from Texaco Chemical Company, Bellaire, Tex. "DYTEK A" is a chain extender that is 2-methyl-2-pentamethylene diamine commercially available from E.I. DuPont DeNemours Co., Wilmington, DE. "DYTEK A" is capped with isophorone diisocyanate (IDPI).

ADHESIVES

Adhesive AAA

An acrylic adhesive similar to that described in U.S. Pat. No. RE 24,906 (Ulrich) comprising a 91/9 copolymer of iso-octyl acrylate/ N-vinyl pyrrolidone at 23% solids in a 50/50 solution of heptane/ethyl acetate.

Adhesive BBB

A water-based acrylic adhesive latex similar to that described in U.S. Pat. No. RE 24,906 (Ulrich) comprising 95/5 copolymer of iso-octyl acrylate/acrylic acid at approximately 42% solids.

Adhesive CCC

A phenolic cured rubber based adhesive similar to that described in U.S. Pat. No. 2,708,192 (Joesting et. al.) comprising 100 parts smoke-sheet rubber, 60 parts tackifying resin, 20 parts phenolic resin and 20 parts zinc oxide in heptane (32% solids).

EXAMPLES 1-19

An approximately 25 cm×75 cm piece of backing D was dipped into a shallow tray containing the indicated binder aqueous dispersion which had been diluted with water to about 12-14% solids and the saturated web passed through a rubber wringer-type squeeze roller to produce a web having a wet binder aqueous dispersion add-on of approximately 200-250%. The resulting wet web was placed on a galvanized or fiberglass woven screen carrier (0.625 cm×0.625 cm mesh size) and the indicated release coating emulsion spray applied to the saturated backing using a single pass spray application with a Nordson spray apparatus to achieve a wet release coating add-on of about 8±2 gm/m$^2$. The wet web was placed in a circulating air oven at approximately 145-155° C. and dried for five (5) minutes.

Adhesive AAA was coated on "Poly Slick" release liner (a silicone coated paper, available from H. P. Smith Co., a division of James River Corp.) using a bar coater to give a wet film of approximately 0.016 cm thickness, to produce an adhesive dry weight of about 25 gm/m$^2$. After an approximately one minute dwell time at ambient temperature the adhesive was laminated to the dried backing and the laminate placed in a circulating air oven at approximately 110° C. for about 4-5 minutes to completely dry the construction.

Release properties of the construction are reported in Table I. Release properties were qualitatively measured under both dry conditions and "wet" conditions, where the tape had been aged for 48 hours at 42° C. and 90% relative humidity, by adhering a piece of tape to the release coating side of a web prepared according to the present invention and measuring the amount of force required to remove the tape from the web (peel strength). Release was identified in dry measurements as "excellent" when the peel strength was less than 0.39 N/100 mm, "good" when the peel strength was less than 0.62 N/100 mm, "fair" when less than 0.93 N/100 mm, "poor" when greater than 0.93 N/100 mm, and "fail" when the web tore. Under wet conditions, the amount of force required to remove the tape from the web was generally observed to be higher. Wet release properties were defined as a percentage of the dry peel strength, and were identified as "excellent" when the difference between the wet and dry peel strength was less than 10%, "good" when the difference was between 10 and 25%, "fair" when the difference was between 25 and 40%, "poor" when the difference was greater than 40% and "fail" when the web tore.

Release coating migration into the backing was qualitatively measured by testing a web prepared according to the process of the present invention that has not been coated with adhesive. The adhesive peel strength of a tape adhered to the non-release coated side of a web is measured and compared with the adhesive peel strength of a tape adhered to a web that has not been treated with a release coating. Thus, if the peel strength of the non-coated side of the web is ninety percent or more of the peel strength of the uncoated web, there is "little" migration of the release coating. If the peel strength of the non-coated side of the web is between seventy and ninety percent of the peel strength of the uncoated web, there is "moderate" migration of the release coating. A peel strength of less than seventy percent of the uncoated web is "heavy" migration of the release coating.

TABLE 1

| EXAMPLE | RELEASE COATING | BINDER | RELEASE PROPERTIES |
| --- | --- | --- | --- |
| 1 | 1 | AA | Excellent, little migration |
| 2 | 2 | AA | Excellent, little migration |
| 3 | 3 | AA | Good, little migration |
| 4 | 4 | AA | Fair, moderate migration |
| 5 | 4 | BB | Fair, moderate migration |
| 6 | 5 | BB | Fair, heavy migration |
| 7 | 6 | BB | Good, little migration |
| 8 | 1 | BB | Excellent, little migration |
| 9 | 1 | CC | Excellent, little migration |
| 10 | 6 | CC | Poor, little migration |
| 11 | 7 | AA | Good Dry, fail wet, mod. mig. |
| 12 | 8 | AA | Good Dry, fail wet, mod. mig. |
| 13 | 9 | AA | Good Dry, fail wet, mod. mig. |
| 14 | 10 | AA | Good Dry, fail wet, mod. mig. |
| 15 | 11 | AA | Good Dry, fail wet, mod. mig. |
| 16 | 12 | AA | Good dry, fail wet |
| 17 | 13 | AA | Good dry, fail wet |
| 18 | 14 | AA | Good dry, fail wet |
| 19 | 15 | AA | Fair dry, fair wet |

Generally speaking, all of the release coating formulations provided release properties to the pressure-sensitive adhesive constructions under dry conditions, but only the silicone containing release coating formulations provided release properties to the constructions after they had been aged for 48 hours at 42° C. and 90% relative humidity. Good release properties correlated with little migration while poor release properties correlated with heavy migration of the release coating.

EXAMPLE 20

Backing A was prepared on a Hergeth card as an approximately 40 cm wide web having a basis weight of about 35 gm/m$^2$. On exiting the card, the nonwoven web was saturated with binder CC utilizing a gravure roll saturating apparatus positioned in line with the Hergeth card. Binder add-on weight was about 80% of the initial web basis weight. Release coating 1 was spray applied to the saturated web immediately following the binder application using a Nordson spray apparatus. The release coating dry add-on weight was approximately 0.10 gm/m$^2$. Subsequent to the release coating aqueous dispersion application, the web was passed into a two zone circulating oven maintained at about 155° C. for a total of approximately 1 minute to dry the web. On exiting the oven, the nonwoven backing was wound on rolls for interim storage.

A pressure-sensitive adhesive construction was prepared by coating adhesive AAA onto a release liner using an extrusion die coating apparatus to produce a wet film of approximately 0.012–0.016 cm thickness, (adhesive dry weight of about 25 gm/m$^2$). The coated adhesive was passed through the first of a three zone circulating air oven maintained at about 45° C. for approximately one (1) minute residence time to produce an approximately 70% solids pressure-sensitive adhesive coating. The pressure-sensitive adhesive was then laminated to the non-release coating treated side of the nonwoven backing by kiss laminating the backing and partially dried adhesive, followed by passing the laminated pressure-sensitive adhesive construction through the second and third zones of the oven, which were maintained at about 105°–110° C. for a total residence time of about three (3) minutes to completely dry the construction. The adhesive/backing laminate was then slit into 2.54 cm and 5.08 cm wide rolls for testing. Release properties of this construction were excellent under both dry and wet conditions.

EXAMPLE 21

A pressure-sensitive adhesive construction was prepared similarly to that described in Example 21, except that backing B was substituted for backing A, binder AA was substituted for binder CC and adhesive coating BBB was applied to the backing at a coating weight of approximately 50 gm/m$^2$ (dry weight). This pressure-sensitive adhesive construction showed excellent release properties under both dry and wet conditions.

EXAMPLE 22

A pressure-sensitive adhesive construction was prepared similarly to that described in Example 21 except that backing C was used in place of backing A, binder BB used in place of binder CC, adhesive CCC used in place of adhesive AAA, the adhesive dry weight was approximately 65 g/m$^2$, and the adhesive was totally dried before application to the backing. This pressure-sensitive adhesive construction showed excellent release properties under both dry and wet conditions.

EXAMPLE 23

A pressure-sensitive adhesive construction was prepared similarly to that described in Example 23 except that a 1.5% solids aqueous dispersion of release coating treatment 1 was utilized. This pressure-sensitive adhesive construction showed good release properties under both dry and wet conditions.

I claim:

1. A process for applying a release coating to a nonwoven sheet material comprising:
    (a) forming a web from fibers;
    (b) applying a water-based binder to said web; and
    (c) applying a water-based release coating to one side of said web while the web is still wet from the application of said binder; and
    (d) drying said web.

2. The process of claim 1, which additionally comprises applying an adhesive to the dried web.

3. The process of claim 1 wherein the water-based binder is selected from the group consisting of latexes incorporating acrylics, styrene/butadiene rubbers, vinylacetate/ethylenes, vinylacetate/acrylates, polyvinyl chloride, polyvinyl alcohols, polyurethanes and vinylacetates.

4. The process of claim 1 wherein the water-based binder is a 25–35 percent solids aqueous dispersion.

5. The process of claim 1 wherein the release coating is a low adhesion backsize comprising poly(dimethyl siloxane).

6. The process of claim 1 wherein the release coating is a low adhesion backsize comprising acrylate polymers.

7. The process of claim 1 wherein the release coating is applied to the wet web within about 4 and 20 seconds after application of the binder.

8. The process of claim 1 wherein the web is dried by conveying the web through an oven.

9. The process of claim 8 wherein the oven has a heat source that is located on the release-coated side of the web as the web passes through the oven.

10. An adhesive tape prepared by the process of claim 2.

* * * * *

UNITED STATES PATENT AND TRADEMARK OFFICE
CERTIFICATE OF CORRECTION

PATENT NO. : 4,973,513

DATED : November 27, 1990

INVENTOR(S) : Riedel et al.

It is certified that error appears in the above-identified patent and that said Letters Patent is hereby corrected as shown below:

On the title page, under United States Patent, "Riedel" should be --Riedel et al.--.

On the first page, "Inventor: John E. Riedel, St. Paul, Minn." should be
  --Inventors: John E. Riedel, St. Paul, Minn.
               Paul E. Hansen, Lake Elmo, Minn.--

Col. 5, line 38, "NH OH" should be $--NH_4OH--$.

Col. 9, line 26, "21" should be --20--.

Col. 9, line 36, "21" should be --20--.

Col. 10, line 4, "23" should be --20--.

UNITED STATES PATENT AND TRADEMARK OFFICE
CERTIFICATE OF CORRECTION

PATENT NO. : 4,973,513

DATED : November 27, 1990

INVENTOR(S) : John E. Riedel

It is certified that error appears in the above-identified patent and that said Letters Patent is hereby corrected as shown below:

Column 10, line 9, "I claim:" should read --We claim:--.

Signed and Sealed this

Fourth Day of May, 1993

Attest:

MICHAEL K. KIRK

Attesting Officer

Acting Commissioner of Patents and Trademarks